Feb. 27, 1968 P. S. MILLER 3,370,822
SUPPORT FOR X-RAY CASSETTE
Filed Aug. 2, 1966 2 Sheets-Sheet 1
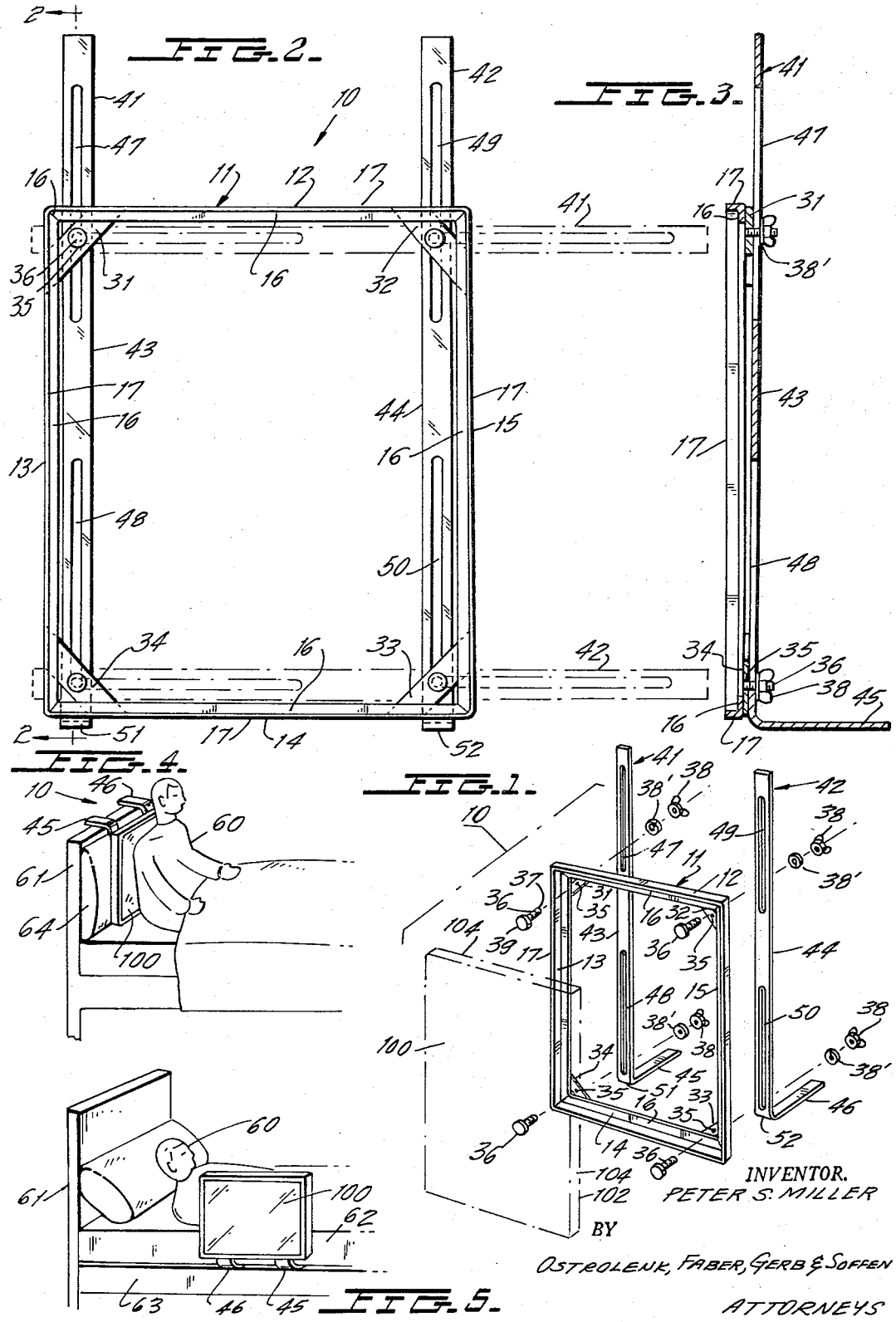
INVENTOR.
PETER S. MILLER
BY
OSTROLENK, FABER, GERB & SOFFEN
ATTORNEYS Feb. 27, 1968    P. S. MILLER    3,370,822
SUPPORT FOR X-RAY CASSETTE
Filed Aug. 2, 1966    2 Sheets-Sheet 2
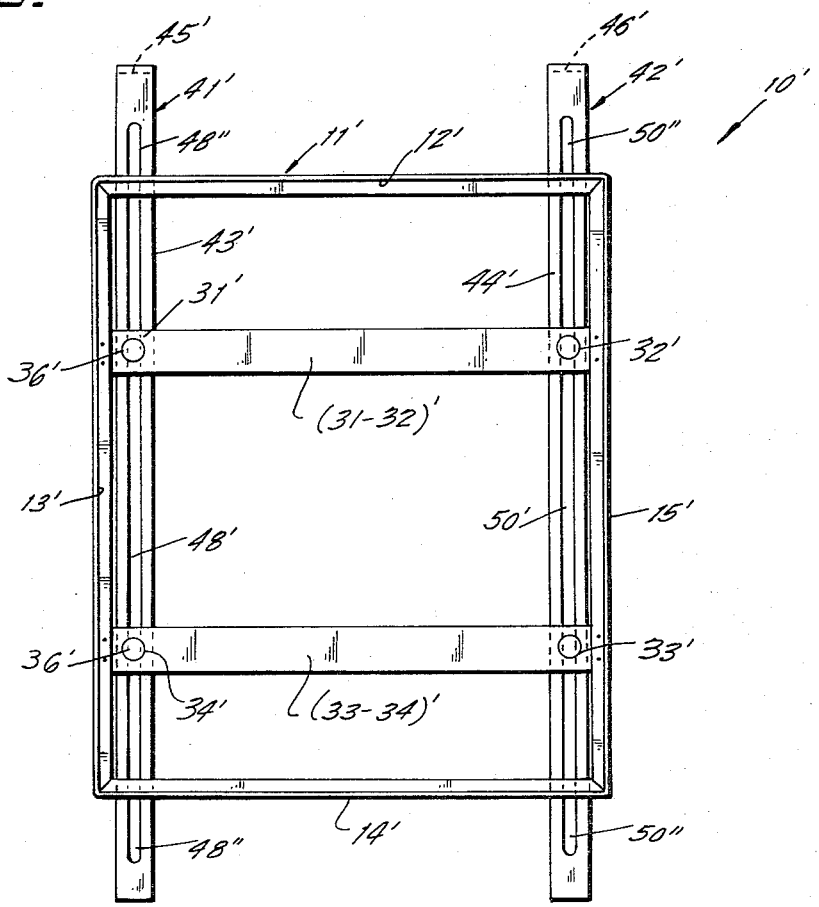
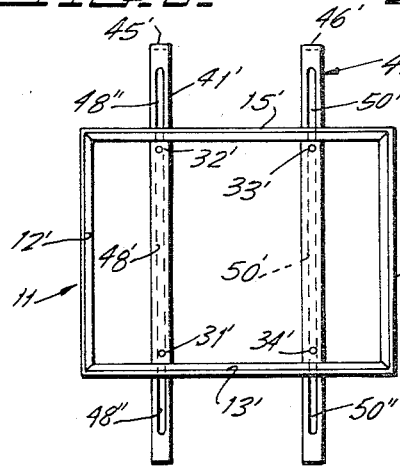
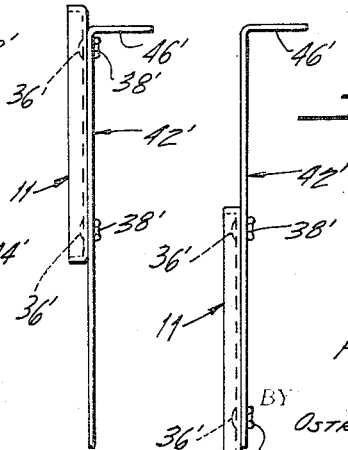
INVENTOR.
PETER S. MILLER
BY OSTROLENK, FABER,
GERB & SOFFEN
ATTORNEYS United States Patent Office 3,370,822
Patented Feb. 27, 1968

3,370,822
SUPPORT FOR X-RAY CASSETTE
Peter Stewart Miller, 119 B-1, 15 St.,
Garden City, N.Y. 11530
Filed Aug. 2, 1966, Ser. No. 569,742
5 Claims. (Cl. 248—476)

ABSTRACT OF THE DISCLOSURE

A support for an X-ray cassette, including a rectangular frame shaped to support the cassette and two support legs positioned behind the frame; the support legs being L-shaped with the first portion of each leg parallel to the rear of the frame and the second portion extending outward therefrom; the legs being removably secured to the back of the frame, whereby the legs may be secured in one of two alternate positions; with the first portions extending parallel to two parallel sides of the rectangular frame or extending parallel to the other two parallel sides of the rectangular frame.

This invention relates to a portable support for an X-ray cassette, and more particularly to such a support which readily permits X-rays to be taken of a bedridden patient without requiring an attendant to hold the cassette adjacent the patient's body.

Many hospital patients, because of physical incapacity, are unable to be transported to the radiology laboratory. Hence, it is required that a portable X-ray projector be taken to the patient's room and be used in conjunction with a physically separate cassette containing the X-ray film. In the past this has oftentimes required two attendants. One to operate the X-ray projector and the other to hold the cassette adjacent the portion of the patient's body being X-rayed. This disadvantageously exposes one of the attendants to repeated dosages of X-ray, subjecting him to physical harm. Also, there is a strong probability of relative movement between the patient's body and the attendant holding the cassette, tending to cause a blurred image.

In order to solve these problems, various supporting devices have previously been suggested for holding the cassette, as for example shown in U.S. Patent Nos. 2,598,529 and 2,919,873. However, such previous cassette supports have generally been bulky, time consuming to assemble and cumbersome to handle. In contradistinction therewith, the cassette support assembly of the instant invention is extremely compact, may be easily assembled and disassembled, rapidly adjusted for the particular application, and is light in weight and low in cost.

Accordingly, it is a primary object of the present invention to provide a support assembly for an X-ray cassette which is of an extremely simplified form.

Another object of the present invention is to provide a support assembly for an X-ray cassette which dispenses with the necessity of an attendant to hold the cassette in position while the X-ray radiograph is being taken.

A further object of the present invention is to provide a simplified X-ray cassette support assembly which includes adjustment means for modifying the location of the cassette in accordance with the patient's size, position and the type of view being taken.

An additional object is to provide an extremely simplified X-ray cassette support, comprising a frame member to snugly receive the cassette and a pair of support legs to support the frame member.

It is still another object of the present invention to provide a support assembly for an X-ray cassette which by means of a relatively simple adjustment may be converted from taking a chest view of a bedridden patient to a lateral view of the patient.

These as well as other objects of the present invention will become readily apparent after consideration of the following general description of the invention and the ensuing detailed description of the illustrative embodiment.

Basically, the cassette support assembly of the present invention is comprised of a frame member and a pair of support legs, each formed of lightweight material, such as aluminum. The frame member includes a peripheral border, which enclosedly defines an internal area having a shape corresponding to that of the cassette to be supported, e.g., rectangular. The sides of the frame member are of a generally L-shaped cross-section, with one of the legs of the L extending inward of the internal area and the other leg of the L extending forwardly of the internal area, and generally perpendicular thereto to define the outermost extreme of the internal area. The first legs of the frame member provide coplanar support surfaces which seat the rear surface of the X-ray cassette, while the forwardly extending second portions provide boundary prtions which frictionally engage the edges of the cassette. The support surfaces of the frame prevent rearward movement of the support out of the enclosed frame area while the forwardly extending boundary portions prevent sidewards movement of the cassette out of said area.

A pair of support legs, each of a generally L-shaped configuration, are secured to the rear portion of the frame, preferably by means of removable bolt members. The pair of L-shaped support legs are connected to securing formations at respectively opposed sides of the rectangular frame, such that a connecting portion thereof lies immediately rearward of the internal area.

Alternative forms of the securing formation are illustrated, with one such arrangement providing an increased degree of height adjustment. When so secured to the frame, another portion of the L-shaped support members rearwardly extends an appreciable distance beyond the cassette, and defines a support means which may be placed on an adjacent fixture (e.g., the headboard of the bed, or intermediate the mattress and underlying spring) for positioning the cassette adjacent the body of the patient.

As an additional aspect of my invention, the pair of support legs may be positioned along either the long or the short sides of the rectangular frame support. The former arrangement might typically be used for taking a chest view of the patient while he is stitting in an upright position on the bed, while the latter arrangement might be used for taking a lateral view of the patient while he is lying down. Further, the means for securing the support legs to the frame generally includes an adjustment features, which may be in the form of longitudinal slots along the connecting portions of the support legs, so as to permit a substantial degree of freedom in the location of the X-ray cassette relative to the support portions of the interconnected legs.

In the following detailed description of the embodiments of the present invention:

FIGURE 1 is an exploded perspective view of an X-ray support assembly constructed in accordance with one form of the present invention.

FIGURE 2 is a plan view of the support assembly of FIGURE 1 shown in its assembled form.

FIGURE 3 is an end profile view taken along the line 2—2 of FIGURE 1 and looking in the direction of the arrows.

FIGURES 4 and 5 show two different arrangements for utilizing the support frame of the instant invention in conjunction with a bedridden patient.

FIGURE 6 is a plan view showing another form of my invention, with a modified securing formation of a type which will provide a greater degree of height adjustment.

FIGURE 7 is an end profile view of the support assembly shown in FIGURE 6, with the support legs located at one of their adjustment extremes.

FIGURE 8 is an end profile view similar to FIGURE 7, but with the support legs shown at the opposite adjustment extreme.

FIGURE 9 shows the manner in which the support legs may be located transverse to that shown in FIGS. 6–8, so as to provide a horizontal profile.

Referring to FIGURES 1–3, the support assembly 10 for receiving X-ray cassette 100, comprises frame member 11 and a pair of support legs 41, 42; all of which are preferably formed of a lightweight material such as aluminum. Frame member 11 is of a rectangular configuration generally corresponding to the dimensions of X-ray cassette 100, and is shown including successively interconnected arms 12, 13, 14 and 15. These arms define and enclose an internal cassette receiving area.

Each of the arms is shown of a generally L-shaped cross-section, having a planar surface 16 extending inward of the internal area, and a forwardly extending boundary portion 17, which defines the outermost extremes of the internal area. Portions 16 all lie within a common plane and are adapted to seat the rear surface 102 of the cassette being received and to prevent rearward movement thereof out of the internal area defined by frame member 11. Boundary portions 17 are of an extent comparable to the width of the cassette and frictionally engage the edges 104 of the cassette to prevent both sideward movement of the cassette outward of the frame internal area and retard forward movement thereof. The corners of the frame includes bracing members 31, 32, 33 and 34 which contain aperture formations 35 for receiving bolts 36, which in turn connect the frame member 11 to the support legs 41, 42 respectively. To prevent accidental loss of the bolts, they may preferably be permanently affixed to frame portions 31–35 as by brazing or any alternative arrangement. The shank portion of the bolts are threaded and receive nuts 38, which may preferably be of the wing-nut variety to facilitate the manual loosening and tightened thereof. A lock washer 98' may also be provided.

The pairs of support legs 41, 42 are each of identical construction, and include respective connecting portions 43, 44 and support portions 45, 46. Support portions 45 and 46 meet connecting portions 43 and 44, respectively, to form a generally L-shaped configuration. The L-shaped configuration permits the connecting portion to lie substantially parallel to the cassette and immediately rearwardly thereof, while the support portions 45, 46 are disposed to rest upon a substantially horizontal support surface (as shown in FIGURES 4 and 5) and in doing so to position the frame 11 (and hence the cassette 100) in a substantially vertical plane.

The connecting portion 43 of support leg 41 has elongated slots 47 and 48, while connecting portion 44 of support leg 42 has similar slots 49 and 50. The slots 47–50 permit the frame 11 to be adjustably positioned along the longitudinal extent of the connecting portions 43 and 44, allowing for a relative adjustment to the location of the adjacent fixture on which the supporting portion 45, 46 rest, or in accordance with the height of the particular patient.

As shown by the solid lines in FIGURE 2, the support legs 41 and 42 can be mounted in a first operative position parallel to the long arms 13 and 15 of the frame 11. In FIGURE 4 the patient 60 is sitting up in bed and the cassette 100 is behind him, being held in position by the support assembly 10, which has been hung on the headboard 61 of the patient's bed. Since the patient's torso is vertical, having the support legs 41 and 42 positioned as shown in the solid lines of FIGURE 1, the cassette is located so as to permit a chest view of the patient to be taken.

Suppose, however, that the patient, as is shown in FIGURE 5, is lying down in bed and the support portions 45 and 46 of the support legs are placed between the mattress 62 and the spring 63 of the bed upon which the patient is reclining. If the cassette were positioned next to his bed such that its long dimension was vertical, the full torso of the patient 60 could not appear in one X-ray radiograph. To accomplish this, it would be necessary that the cassette be held such that its long dimension is horizontal. In order that the long dimension of the cassette be horizontal to take a lateral view of the torso patient 60, the long legs 13 and 15 of the frame 11 must be perpendicular to the support leg connecting portions 43 and 44. This is achieved by repositioning support legs 41, 42 in a second operative position such that support leg 41 is connected to formations 31 and 32 and support leg 42 is connected to formations 33 and 34, as shown dotted in FIGURE 2.

In addition to the utilization of the headboard and the mattress spring crevice for receiving support portions 45, 46 various other possible arrangements may be utilized; as for example, the support may be directly placed on the shoulders of the patient or on the side of a chair.

Reference is now made to FIGURES 6–9, which illustrate another form of my invention, having an alternative means for securing the support legs to the frame portion. For purposes of facilitating a comparison with my above-described embodiment, those components of corresponding function are indicated by prime numerals.

The support assembly 10' comprises a frame member 11', having interconnecting legs 12', 13', 14', and 15', which receive the X-ray cassette (not shown), in the same manner as in my previous embodiment. A pair of bar-like securing members 31–32' and 33–34' are connected to and extend between opposed frame sides 13', 15'. These securing members are suitably affixed to the frame member, as for example by brazing. The opposed ends of the securing members include bolt receiving apertures at the locations generally indicated as 31', 32', 33', and 34'. Bolt members 36' are received in these apertures, and are preferably permanently affixed thereto. The pair of support legs 41', 42' include connecting portions 43', 44' respectively and support portions 45', 46'. The connecting portions of the respective support arms include elongated slots 48', 50' respectively, which it is noted extend substantially along the entire length of the support leg connecting portions. As in the case with the previous embodiment, the shank portions of the connecting bolts 36' extend through longitudinal slots 48', 50' and receive tightening nuts.

The substantial length of elongated slots 48', 50' provides a considerable degree of height adjustment. More specifically, FIGURE 7 shows the frame member 11' being adjusted to its extreme upward position, with the securement locations 31', 32' being positioned at the upward extremes 48" and 50" of the longitudinal slots. Conversely, FIGURE 8 shows the opposite extreme of adjustment, with the securement locations 34', 33' being positioned at the lowermost portions of the slot 48''', 50'''. It should naturally be understood that any degree of adjustment intermediate those shown in FIGURES 7 and 8 (as, for example, illustrated in FIGURE 6) may be provided. It should thus be recognized that this arrangement provides for substantial adaptation to both the height of the patient as well as to the manner in which the cassette is to be supported adjacent the patient's body.

FIGURE 8 shows the re-orientation of the support legs 41', 42', perpendicular to their arrangement in FIGURES 6–8, in a manner which will permit a horizontal profile, as typically shown in FIGURE 5.

It is therefore seen that the instant invention provides a cassette support structure, which is of an extremely simplified and inexpensive design, may be rapidly assembled and disassembled, requires a minimum of storage space, and exhibits versatility of application in accordance with the particular type of X-ray view being taken of the patient, and the manner in which the patient is confined to his environment.

Although there have been described preferred embodiments of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A support assembly for receiving an X-ray cassette and positioning the cassette adjacent a patient's body;
   said support assembly comprising a frame member and a pair of support legs connected thereto;
   said frame member having a peripheral border defining and enclosing an internal area of a size to snugly receive the cassette;
   said peripheral border including planar support surfaces, lying within a common plane, and extending inward of said internal area; and
   boundary portions, extending forwardly of said support surfaces and generally perpendicular thereto, to define the outermost extremes of said internal area;
   said boundary portions dimensioned to frictionally engage the sides of the cassette, while said planar support surfaces seat the rear of the cassette, such that said boundary portions prevent sideward movement of the cassette out of said internal area, and said planar support surfaces prevent rearward movement of the cassette out of said internal area;
   each of said support legs being of a generally L-shaped configuration, and including a connecting portion and a support portion;
   securing means connecting said connecting portions to the rear of said frame member, such that said connecting portions extend substantially parallel to said internal area, and immediately rearward of the cassette; and
   said support portions rearwardly extend generally perpendicular to said internal area;
   the connecting portions of said pair of support legs space-separated and extending parallel to first and second opposed regions of said peripheral border,
   said support portions providing support means for placement on an adjacent fixture, such that the cassette is positioned adjacent the portion of the patient's body to be X-rayed;
   said frame member of a rectangular shape, such that said peripheral border includes successively interconnected first, second, third and fourth sides;
   said first and third sides parallel extending in a first direction and said second and fourth sides parallel extending in a second direction, perpendicular to said first and third sides;
   said first and third sides of a first length and said second and fourth sides of a second length, said first length appreciably greater than said second length;
   said frame member including first, second, third and fourth securing formations;
   a first of said pair of support legs including fifth and sixth securing formations, and a second of said pair of support legs including seventh and eighth securing formations;
   said securing means removably connecting said pair of support legs to said frame member in either a first or second operative position;
   said first operative position corresponding to said securing means cooperatively interconnecting said fifth and sixth securing formations of said first support leg to the first and fourth securing formations of said frame portion, and said seventh and eighth securing formations of said second support leg to the second and third securing formations of said frame portion, such that said support portions of the pair of support legs are space-separated in said second direction;
   and said second operative position corresponding to said securing means cooperatively interconnecting said fifth and sixth securing formation of said first support leg to said first and second securing formation of said frame portion, and said seventh and eighth securing formation of said second support leg to the fourth and third securing formation of said frame portion, such that said support portion of the pair of support legs are space-separated in said first direction.

2. The support assembly of claim 1, in which said fifth, sixth, seventh and eighth securing formations comprise slots extending along the length of said support leg connecting portion;
   said securing means including bolt means passing through said slots and the cooperating securing formations of said frame member;
   said cooperating securing formation being adjustably positionable by the location of said bolt means along said slots, to adjust the location of said leg support portions relative to said internal area.

3. In combination, the support assembly of claim 1 and a rectangular X-ray cassette; said cassette having a peripheral edge surface and a rear surface;
   said cassette rear surface being positioned against said first arms of the frame legs and said cassette peripheral edge surface frictionally engaging said second arms of said frame legs;
   said first arms preventing rearward movement of said cassette out of said rectangular area, and said second arms preventing sidewards movement of said cassette out of said rectangular area.

4. The support assembly of claim 1,
   said securing formations including support members located at the corners of the rectangular frame member.

5. The support assembly of claim 1,
   said securing formation including first and second securing members connected to and spanning between said second and fourth frame sides;
   said securing members extending parallel to said first and third frame sides;
   the connecting portions of one of said pair of support legs secured to one end of said securing members, and the connecting portions of the other of said pair of support legs secured to the opposite end of said securing members, said connecting portions extending perpendicular to said support members and parallel to said second and fourth frame sides.

References Cited

UNITED STATES PATENTS

| 1,156,885 | 10/1915 | Caine | 248—201 X |
| 1,368,125 | 2/1921 | Durett | 248—201 |
| 2,598,529 | 5/1952 | Fritz | 248—457 |

ROY D. FRAZIER, *Primary Examiner.*

CHANCELLOR E. HARRIS, *Examiner.*

F. DOMOTOR, *Assistant Examiner.*